G. ALBER.
FRICTION CLUTCH.
APPLICATION FILED MAR. 19, 1920.
1,371,719.
Patented Mar. 15, 1921.
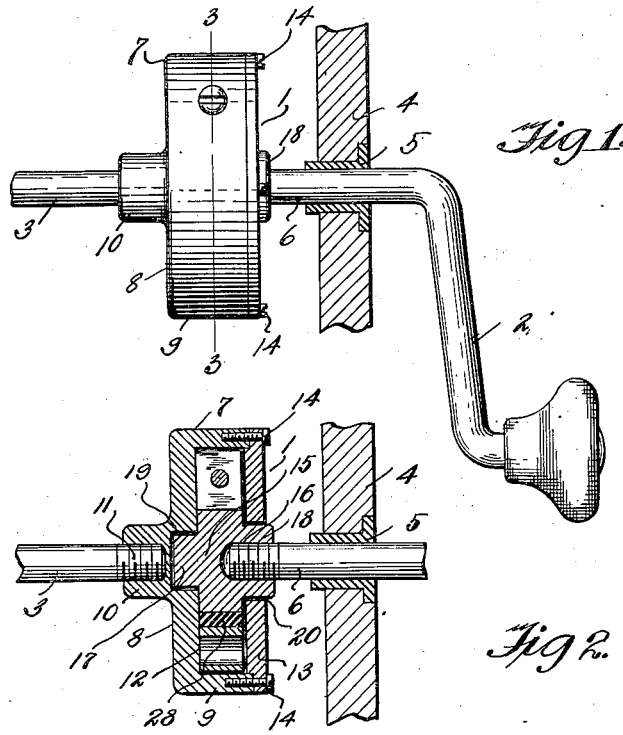
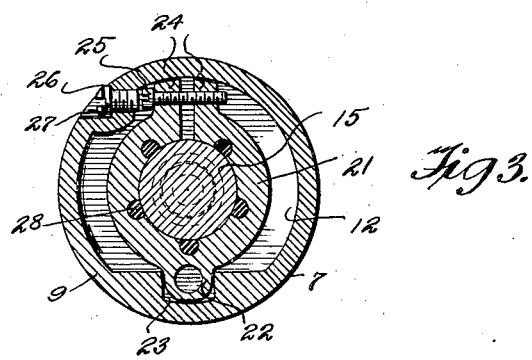
Witness
A. Lundin
Inventor
George Alber
By
C. C. Shepherd, Attorney

UNITED STATES PATENT OFFICE.

GEORGE ALBER, OF COLUMBUS, OHIO.

FRICTION-CLUTCH.

1,371,719.  Specification of Letters Patent.  Patented Mar. 15, 1921.

Application filed March 19, 1920. Serial No. 367,156.

*To all whom it may concern:*

Be it known that I, GEORGE ALBER, a citizen of the United States, residing at Columbus, in the county of Franklin and State of Ohio, have invented certain new and useful Improvements in Friction-Clutches, of which the following is a specification.

This invention relates particularly to release clutches for talking machine motors, and has for its primary object to provide a device which is adapted to be interposed between the shaft of a spring motor and the winding crank thereof, the purpose and construction of the device being to enable the manually manipulated crank to rotate the motor shaft in unison therewith when the spring or springs of the motor are under normal stress conditions but to release the motor shaft from connection with the crank when the motor structure has been wound to a predetermined extent, the construction being such as to prevent the spring structure of a motor or other analogous device from being harmed by the effects of over-winding.

In use the springs of a talking machine motor are frequently over-stressed by undue and careless winding thereof. This condition has the effect of frequently breaking such springs or, at least, results in their loss of resiliency and power, therefore, in view of these conditions repairs and replacements are often needed and the rotation of the record supports is rendered uneven and at varying speeds. The present invention, therefore, consists in the provision of a slip clutch construction along friction principles which is so positioned that the overwinding of the spring structure of a motor will be prevented, and frequently the conditions detrimental to the motor's operation will be largely avoided.

The invention further consists in a slip or relief clutch of the above character which is small and compact in design and is adapted to be positioned within the cabinet of a talking machine so as to be concealed from an exterior viewpoint, and said clutch is further formed to embody features of adjustment which enable the same to be readily set to conform to the strength of the spring structures of varying motors.

For a further understanding of the invention, reference is to be had to the following description and to the accompanying drawing, in which similar characters of reference denote like and corresponding parts throughout the several views thereof. In said drawing:

Figure 1 is a side elevation of the clutch comprising the present invention, and illustrating its application to the crank member of a talking machine.

Fig. 2 is a longitudinal sectional view taken through the clutch, and,

Fig. 3 is a transverse vertical sectional view taken along the plane denoted by the line 3—3 of Fig. 1.

Referring more particularly to the details of the invention, the accompanying drawing discloses the slip clutch 1 comprising the preferred form of the present invention. In its preferred adaptation, said clutch is employed in connection with the crank structure 2 of a talking machine and is adapted to unite said crank structure with the shaft 3 of a spring motor or its equivalent (not shown). The crank structure 2, as shown, is located exteriorly of the cabinet wall 4 of a talking machine and is rotatably journaled as at 5 within said wall, the operating end 6 of the crank structure being disposed so as to extend in longitudinal alinement with the motor shaft 3. The clutch itself is interposed between the meeting ends of the shaft sections 3 and 6, and is adapted to lie within the wall 4 so as to be concealed from exterior view. By this location, the use of the clutch will not alter or mar the appearance of a talking machine but as far as practical reasons are concerned, it will be apparent that if desired said clutch may be exteriorly located.

In its preferred form the clutch 1 consists of a housing or casing 7 preferably of circular and hollow form, said casing, therefore, includes a vertical wall 8, an integral longitudinal extending annular wall 9 and a longitudinal and axially located boss 10. The interior of said boss is suitably threaded so as to receive the similarly threaded end 11 of the motor shaft 3. By virtue of this construction, it will be manifest that the housing or casing will be carried in a rigid manner by the motor shaft and will be capable of rotating in unison with the latter. The arrangement of the walls 8 and 9 is such as to provide an internal substantially circular chamber 12, which is normally covered by means of a removable plate 13, the latter being secured in detachable connection with the wall 9 by means of removable screws or their equivalents 14.

The operating end 6 of the crank structure is suitably threaded to receive a friction collar 15, which latter is adapted to be positioned within the chamber 12 of the casing 7, and is formed with an axially located threaded bore 16 for the reception of the threaded end 6 of said crank structure. The collar is provided with journaling hubs 17 and 18, the former being rotatably disposed within a circular recess 19 formed in the vertical wall 8 of the casing, while the hub 18 is also rotatably positioned within an axial opening 20 provided in the plate 13. It will thus be seen that the collar 15 will be capable of rotating with the crank structure, and independently of the motor shaft 3.

In order to transfer the movement of the collar 15 to the motor shaft, the chamber 12 is provided with a split gripping ring 21. This ring is so formed as to receive the collar 15 and is capable of being frictionally clamped into engagement with the latter so that the same may rotate together. In its preferred form, the ring 21 is provided with an enlargement 22, which is positioned within a recess 23 formed in the annular wall 9 of the casing, this construction locks said ring and the casing together for simultaneous rotation. The frictional grip which the ring 21 exercises upon the collar 15 is governed by forming said ring with a pair of spaced apertured and outstanding ears 24, whose relative positions are adjusted by means of a set screw or its equivalent 25. Manifestly, by tightening the screw 25, said ears will be forced toward each other, thereby causing the inner periphery of the ring to be brought into close frictional engagement with the outer periphery of the collar 15, and this frictional engagement is normally of such degree as to cause the ring and its accompanying casing to rotate in unison with the crank structure. The wall 9 may be provided with an opening 26 disposed in alinement with the head of the set screw 25. By removing the screw 27 covering the opening 26, the set screw 25 will be rendered accessible, thereby permitting of convenient adjustment of the frictional grip which the ring 21 will exercise upon the collar 15. By the provision of the opening 26 the necessity of removing the cover plate 13 to effect adjustment of the ring is avoided. If desired, fiber inserts 28 may be positioned around the inner periphery of the ring so that the latter may obtain proper frictional contact with the periphery of the collar 15. Also, the inserts 28 may be employed to take up the natural wear upon the relatively movable parts of the clutch and may be readily removed and replaced.

In operation, it will be apparent that the rotation of the crank structure 2 will impart similar rotation to the collar 15 carried thereby. This rotation on the part of the collar is thence transmitted to the ring 21 when the latter is in close frictional contact with the collar. By the provision of the enlargement 22, it will appear that the ring will, in turn, rotate the casing 7, and since the latter is rigidly mounted upon the motor shaft, it will be evident that said motor shaft will be caused to rotate in unison with the crank structure. This movement on the part of the motor shaft will be continued until the spring structure of the motor with which the shaft 3 is associated has been wound to a predetermined extent and when this extent has been reached the resistance offered by the shaft 3 will cause the collar 15 to slip or independently rotate within the ring 21, thus preventing the power applied to the crank structure from being transmitted to the motor shaft. Through the medium of the clutch 1, therefore, an element of safety is provided which will effectively prevent the over-winding of a motor spring and will serve to overcome the many troubles which accrue from the over-winding of such springs.

While the invention has been specifically described as a talking machine attachment, owing to its great usefulness in this particular field, yet it will be understood that the use of the clutch is not limited to this particular field of operation but that the said clutch may be employed in connection with many other forms of mechanism wherein driving and driven members are provided.

What is claimed is:

1. A relief clutch for talking machine motors comprising a casing capable of being rotatably connected with a motor member, a split gripping element located within said casing and mounted to rotate in unison with the latter, and an operating member positioned within said element and frictionally gripped thereby, said element being capable of rotating with the operating member when said motor member is under normal load conditions but to be rotatably released from said operating member when said motor member reaches a predetermined load condition.

2. A relief clutch comprising a driving member and a longitudinal alined driven member, a collar rotatable with one of said members, a casing rotatable with the other member and a split friction ring mounted within said casing and capable of frictionally gripping said collar whereby the latter will be caused to rotate in unison with said casing.

3. A relief clutch for talking machine motors, a winding crank, a motor shaft, a casing carried by said motor shaft and having an internal chamber, an element carried by said winding crank and disposed within said chamber, and a split ring surrounding said element and rotatable with said casing, said ring serving to frictionally unite said element with said casing for uniform rotation under normal load conditions, but to release said casing from said element when an overload is placed upon said motor shaft.

4. A relief clutch for talking machine motors comprising a casing capable of being rigidly carried by the end of a motor shaft, a collar positioned within said casing and adapted to be rigidly carried by the end of a winding shaft, a split friction ring mounted within said casing and rotatable with the latter, and adjustable means passing through the ends of said ring and capable of adjusting the degree of friction between said ring and said collar.

5. A relief clutch for talking machine motors comprising a casing capable of being rigidly carried by one end of a motor shaft, a collar mounted upon one end of a winding shaft and located within said casing, said collar being capable of rotating independently with respect to said casing, a split ring positioned within said casing and surrounding said collar, means whereby said ring will be rotatably connected with said casing, and a set screw passing through the spaced ends of said ring and capable of adjusting the degree of friction between said ring and collar.

6. A relief clutch for talking machine motors, comprising a casing arranged to be rigidly carried by one end of a motor shaft, a member rotatably positioned within said casing and rigidly carried by a winding shaft, a split friction ring located within said casing and arranged to frictionally engage with said member, means whereby said ring will be caused to rotate in unison with said casing, a set screw for controlling the degree of friction existing between said ring and said member, and means whereby said set screw may be adjusted without removing said casing.

7. A relief clutch for talking machines comprising a casing capable of being rigidly carried by one end of a motor shaft, a winding shaft, a member rigidly carried by said winding shaft and positioned within said casing, a split ring rotatable with said casing and situated to surround said member, means for adjusting said ring to control the degree of friction between the latter and said member, and a plurality of fiber inserts positioned around the inner periphery of said ring and arranged in contact with said member.

8. In a relief clutch for talking machine motors, a winding element and a motor shaft, a collar removably threaded upon one end of the winding element, a casing removably positioned upon the adjoining end of the motor shaft, said casing being provided with an internal chamber arranged to receive said collar, a split resilient gripping member positioned within said chamber and arranged to be received and positioned around said collar, said gripping member being provided with spaced ends, a screw arranged to pass through said ends so as to draw the latter relatively whereby said gripping member may exercise a varying frictional grip upon said collar, and a projection formed with said gripping member and arranged to be received within a recess provided within said casing, whereby said gripping member will be connected for rotation in unison with said casing.

9. In a relief clutch for talking machine motors, a winding element and a longitudinally alined motor shaft, a collar carried by one end of said winding element, a casing rotatably carried by the adjoining end of said motor shaft, said casing being provided with a chamber capable of rotatably receiving said collar, a split resilient gripping member positioned within said chamber and arranged to surround and to circumferentially engage said collar, said gripping member being provided with spaced ends and connected for rotation in unison with said casing, a screw arranged to pass through the ends of said gripping member to adjust the frictional grip between the latter and said collar, and a movable element arranged to cover an opening provided in said casing in alinement with said screw, whereby upon the removal of said element said screw may be adjusted without involving the removal of said casing from about said gripping member.

In testimony whereof I affix my signature.

GEORGE ALBER.